United States Patent [19]
Watson

[11] Patent Number: 5,198,915
[45] Date of Patent: Mar. 30, 1993

[54] UNDERWATER INSPECTION APPARATUS AND METHOD

[75] Inventor: John Watson, Alford, Scotland

[73] Assignee: National Research Development Corporation, London, England

[21] Appl. No.: 634,122

[22] PCT Filed: Jun. 30, 1989

[86] PCT No.: PCT/GB89/00732
§ 371 Date: Dec. 31, 1990
§ 102(e) Date: Dec. 31, 1990

[87] PCT Pub. No.: WO90/00268
PCT Pub. Date: Jan. 11, 1990

[30] Foreign Application Priority Data
Jul. 1, 1988 [GB] United Kingdom ............ 8815658

[51] Int. Cl.[5] .................. G03H 1/04; G03H 1/10
[52] U.S. Cl. .................................. 359/10; 359/27; 359/30
[58] Field of Search ............ 350/3.8, 3.82, 3.83, 350/3.67; 359/27, 29, 30, 10

[56] References Cited
U.S. PATENT DOCUMENTS
3,442,566 5/1969 Forward et al. .
3,490,827 1/1970 Van Ligten et al. .
3,533,056 10/1970 Clark .
3,539,242 11/1970 Burch .
3,561,838 2/1971 Gabor .
3,600,935 8/1971 Baum .
3,837,726 9/1974 Suzuki et al. .

FOREIGN PATENT DOCUMENTS
0169143 7/1985 European Pat. Off. .
0234982 1/1987 European Pat. Off. .
2261093 6/1974 Fed. Rep. of Germany .
2543299 9/1984 France .

OTHER PUBLICATIONS
Andreev et al., "Image Pulsed Holography in the Green Region of the Spectrum", Opt. Spectrosc. (USSR), vol. 49, No. 5, Nov. 1980, pp. 514 to 515.
P. Hariharan, Optical Holography, Cambridge University Press, Cambridge, 1986, pp. 69 to 71.

Primary Examiner—Bruce Y. Arnold
Assistant Examiner—Martin Lerner
Attorney, Agent, or Firm—Cushman, Darby & Cushman

[57] ABSTRACT

A camera for use in holography comprises a source of coherent radiation (55), a beam splitter (55,56) for splitting radiation from said source into a reference and a recording beam, a film holder (62) for holding a recording medium (61), means for directing the reference beam on to the recording medium, means for directing the recording beam on to an object and means for combining the recording beam after reflection from the object with the reference beam to form a hologram within the recording medium.

11 Claims, 12 Drawing Sheets

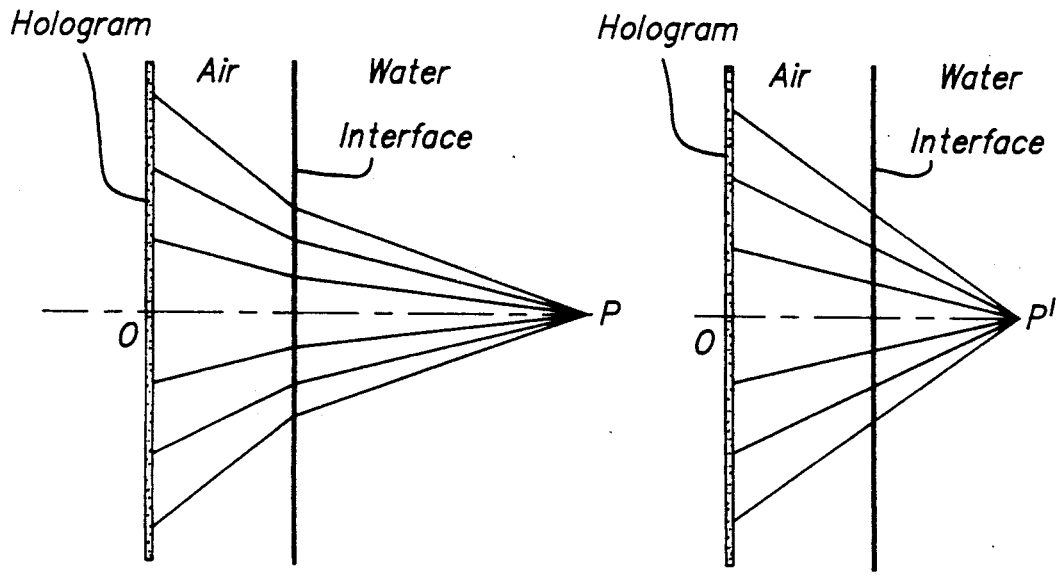
FIG.14b  Recording
FIG.14a  Replay
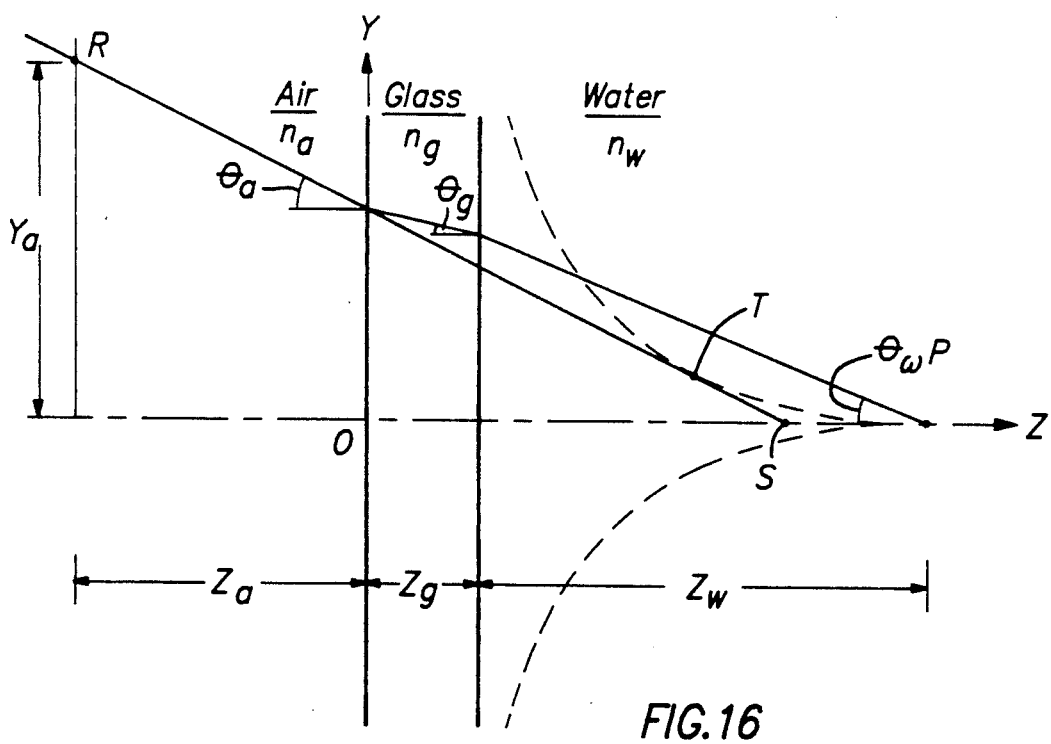
FIG.16

UNDERWATER INSPECTION APPARATUS AND METHOD

This invention relates to holography and, in particular, to methods of and apparatus for the holographic inspection of underwater objects such as pipelines.

The recovery of oil and gas has presented a significant challenge to the offshore industry as regards routine inspection and maintenance of subsea installations. As drilling now proceeds to even greater depths the problems encountered increase and more emphasis is now being placed on remote, rather than diver held, techniques of inspection. Visual inspection is extensively utilised with the major part of this being carried out using conventional photography, stereo photography and closed-circuit television. These methods all, however, suffer several drawbacks. Conventional photography produces two-dimensional images of moderate resolution but loses parallax information and, particularly in close-up, suffers from perspective distortion and limited depth of field. Stereo-photography improves this situation by producing a three-dimensional image from two fixed viewpoints: parallax information is still lost. Furthermore, if precise dimensional measurements are required, sophisticated photogrammetric techniques are necessary with limited resolution as yet occupancy. Television systems while providing real-time operation are essentially low resolution techniques.

Holography, by comparison, suffers from none of these limitations and gives the observer an infinity of viewpoints from which to view the scene. It is the ability of holography to reproduce, remote from the original scene, a full size three-dimensional image possessing high resolution and low in optical aberrations which make it a potentially powerful method of visual inspection. Applications which can be envisaged include general archiving, measurement of corrosion pitting and cracking, examination and measurement of damage sites, structural profiling and examination of marine growth. In all such applications the required end product is usually a high resolution hologram of a particular scene of interest. From this hologram, inspection can be performed directly on an image reconstructed in real space.

Holographic visual inspection or "hologrammetry" as it has now come to be known, is becoming increasingly important as a means of making high resolution dimensional measurements of engineering components and structures. This is particularly true when the inspection site is located in a hazardous environment or is an area where access is difficult, such as encountered in the nuclear power generating industry or the offshore oil and gas industries.

The basis of holography as a means of high resolution visual inspection is the holographic recording of the scene of interest with the subsequent replay of the processed hologram in the real image mode of reconstruction. Reconstruction of the real image produces an image which is reversed left-to- right and back-to-front when viewed from the space in front of the hologram. Such a representation of the image is known as "pseudoscopic".

In general, the holographic interference field is captured on photographic film. Other media such as thermoplastic film, photochromic materials, non-linear optical crystals and dichromated gelatin may, alternatively, be used. Holographic film differs from the film used in ordinary photography only in that the grains of silver halide are of the order of a few nanometres across as compared to micrometres. Such film is very insensitive to light but has the capacity to record the fine detail inherent in an interference field. Typical sensitivity is around a few millijoules per square meter. The exposed film is chemically processed in a similar, but somewhat more elaborate, way to ordinary film to render the holographic interference permanent.

For purposes of visual inspection, however, creation of the virtual image is not the most suitable form of holographic reconstruction. It so happens that if we turn the plate around and illuminate it from behind with a wave which is the exact conjugate of the reference beam, a conjugate image will be located in real space in front of the plate. The image so created is optically identical to the original save that it appears to be reversed left to right and back to front. It is this real, pseudoscopic image which forms the basis of a method of visual inspection.

The utilisation of holography in visual inspection, relies on the creation and optimisation of the real image of a scene or object. The real, or more correctly the conjugate image, is formed and reconstructed. A parallel reference beam is often used in recording the hologram, since reconstruction then is a simple case of turning the film around. If a diverging reference beam was used in recording, then a converging beam of identical curvature would be needed in reconstruction.

Because the conjugate image is located in real space in front of the observer, visual inspection can be carried out directly on this image using all the conventional tools of the trade, namely, measuring microscopes, photography and TV. Optical sections can be taken through the resulting reconstruction by merely placing a piece of film across the image and recording directly, without the need for any lenses. This concept is sometimes hard to accept without seeing it. An image is actually formed in space in front of the observer on which all optical tests can be performed as if it were the original subject.

The usefulness of holography for accurate engineering measurement, whether this be in water or in air, is dependent on its ability to reproduce an exact image of the object which is low in optical aberrations and possesses sufficient resolution to allow detailed measurements to be made. In practice, loss of resolution and aberrations can occur at both recording and replay stages. There are several recognised factors which can give rise to optical aberrations and, ultimately, degrade image fidelity. Such factors include, (a) distortion of the fringe pattern recorded in the emulsion as a result of chemical processing,
(b) the optical quality of the emulsion substrate
(c) variations between reference and reconstruction wavefronts
(d) variations between reference and reconstruction wavelength, and
(e) the quality of the reconstruction beam.

The above factors affect the ability to produce optimum conditions for wavelength reconstruction but can, with reasonable precautions, be controlled to a degree sufficient to produce high resolution images.

In accordance with the present invention there is provided a camera for use in holography comprising a source of coherent radiation, means for splitting radiation from said source into a reference and a recording beam, film holder means for holding a recording medium, means for directing the reference beam on to the recording medium, means for directing the recording beam on to an object and means for combining the recording beam after reflection from the object with said reference beam to form a hologram within said recording medium.

The invention will be particularly described with reference to the accompanying drawings in which.

Figure 7:
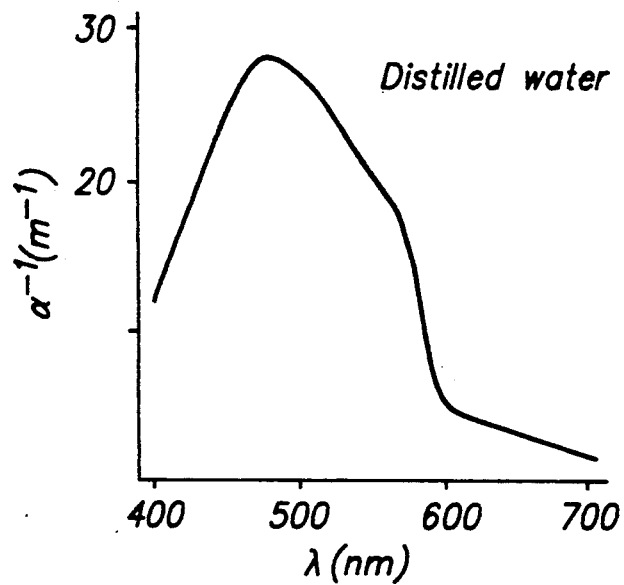
Figure 8:
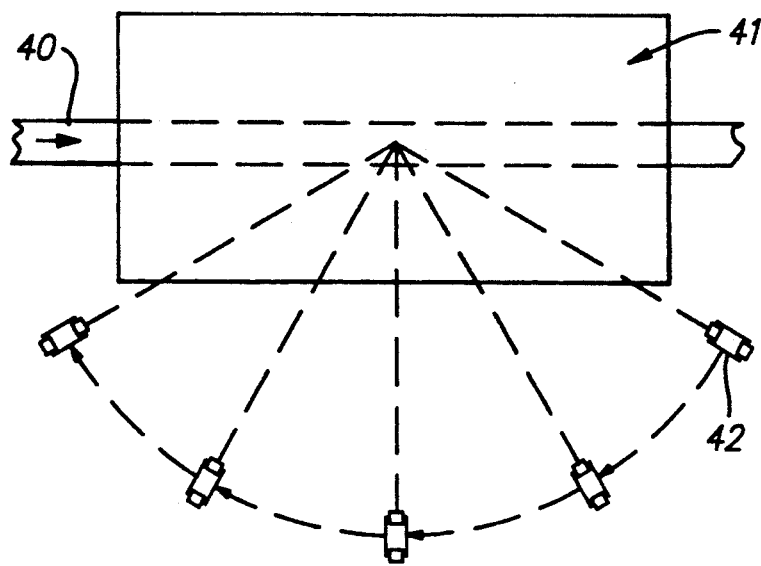
Figure 9A:
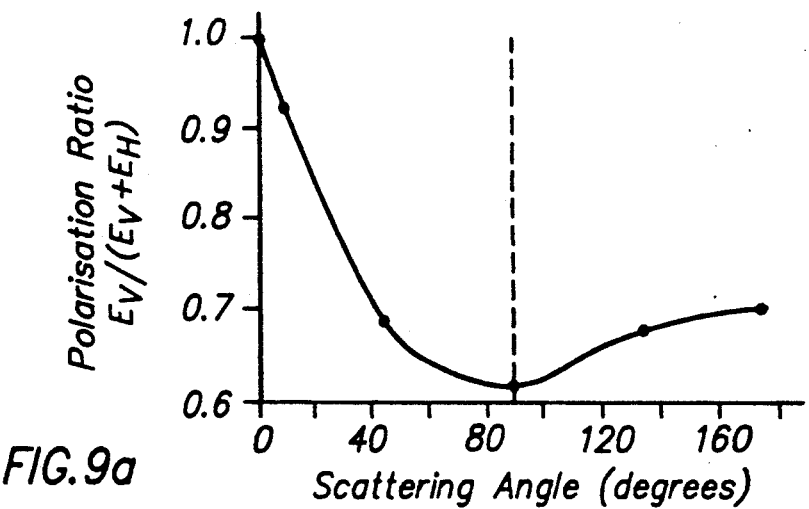
Figure 9B:
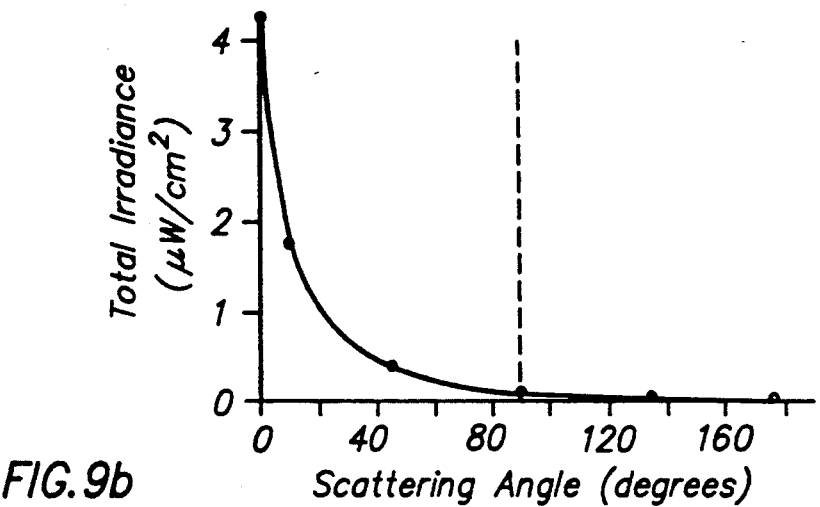
Figure 10:
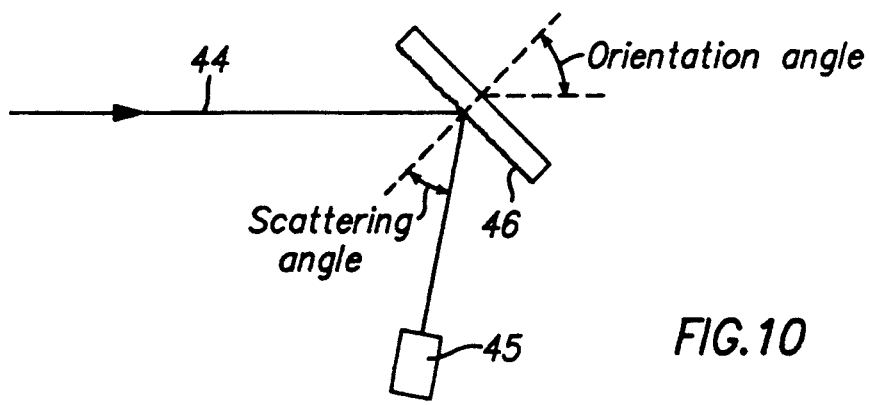
Figure 11A:
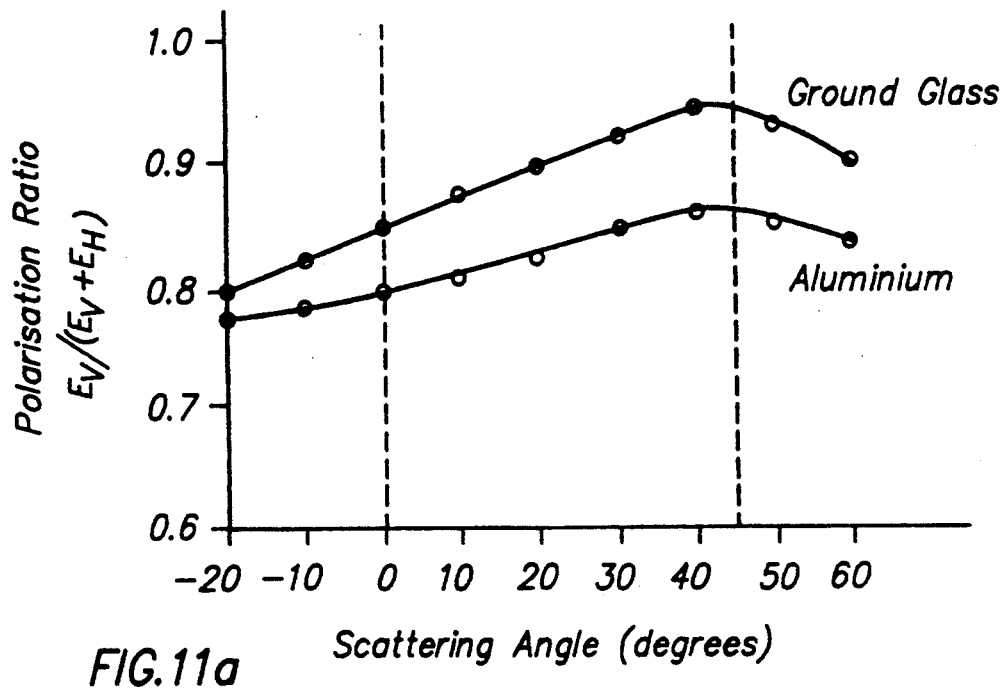
Figure 11B:
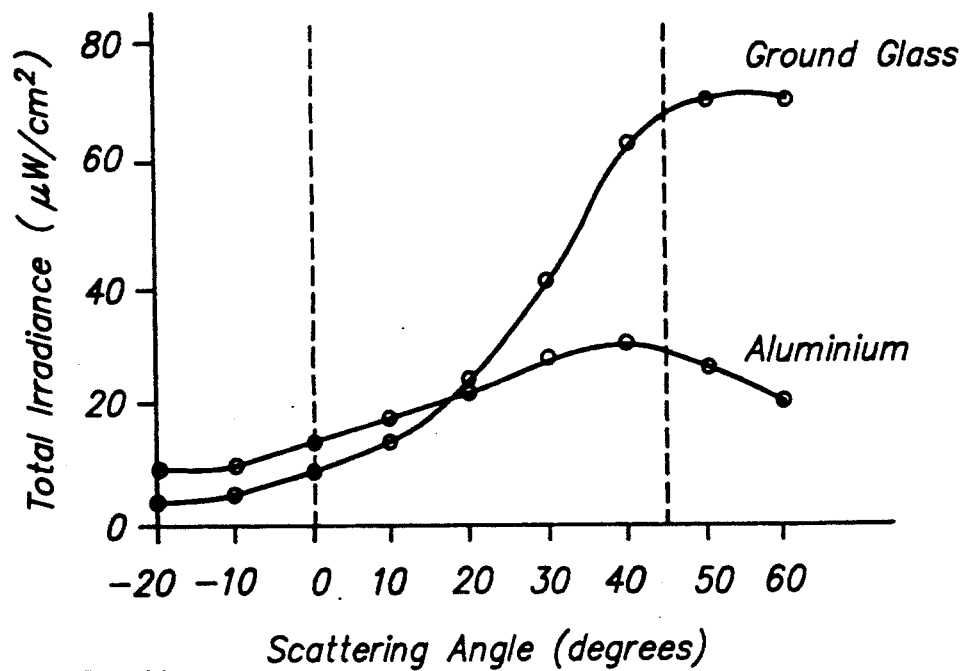
Figure 12:
Figure 13:
Figure 17:
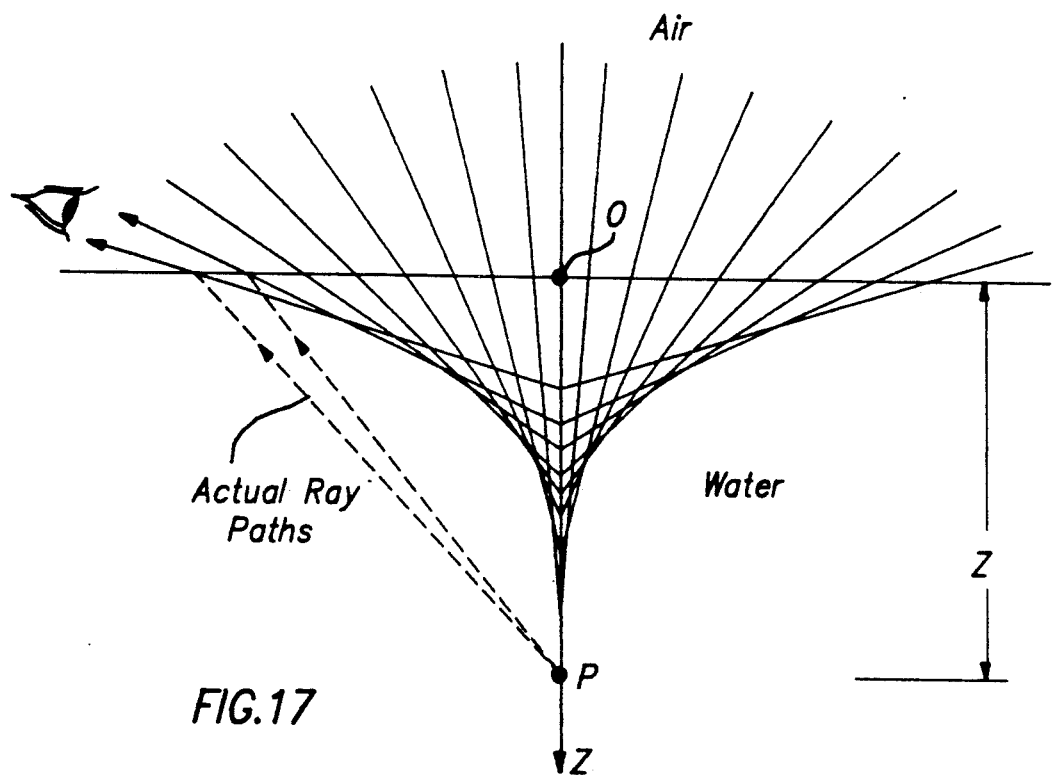
Figure 18:
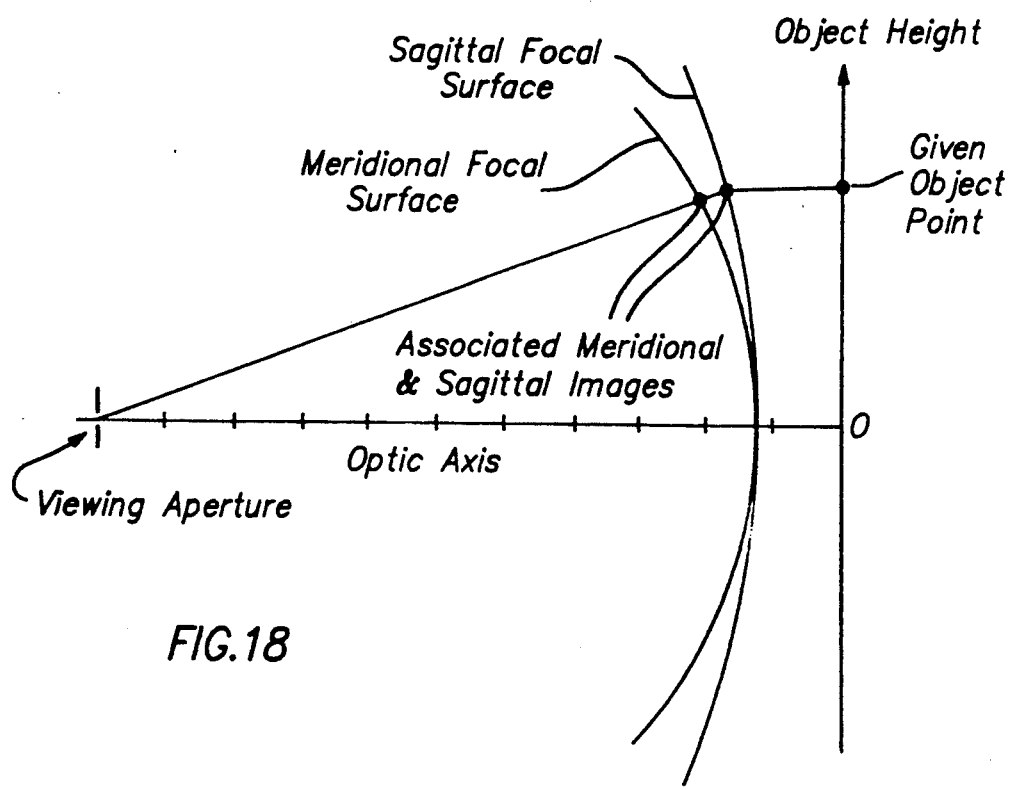
Figure 19A:
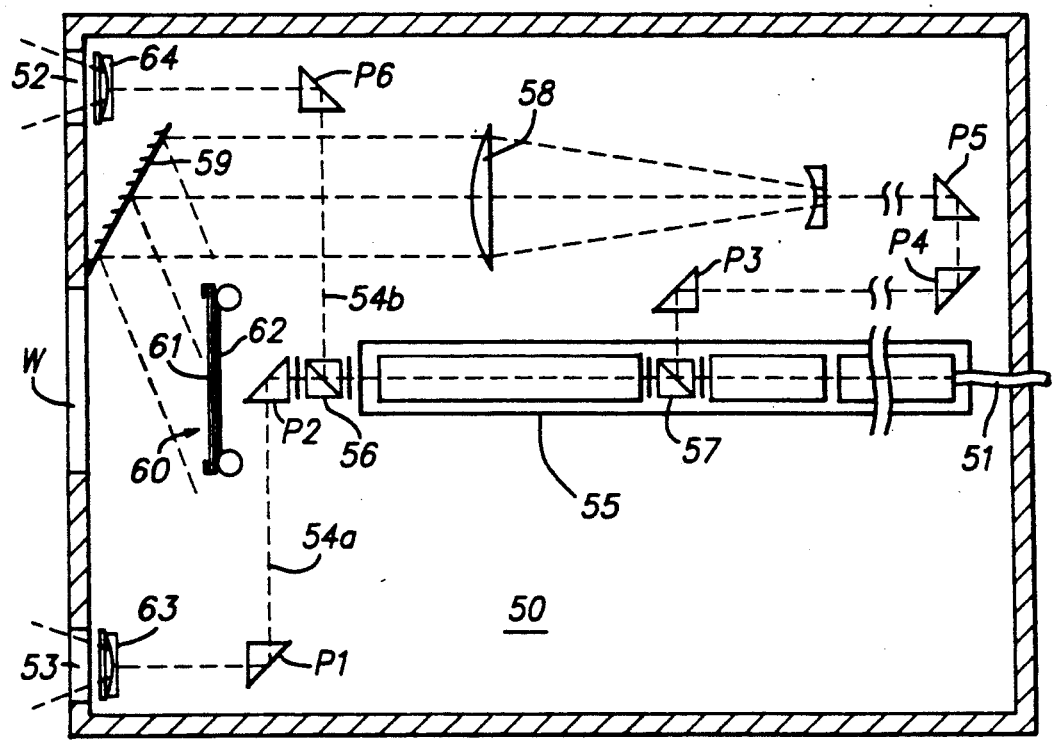
Figure 19B:
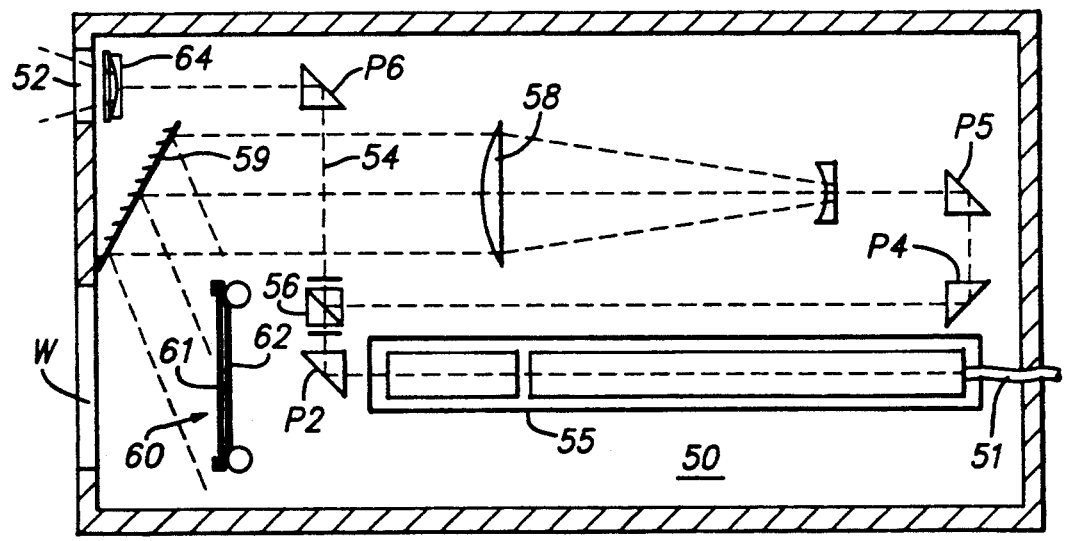
Figure 20:
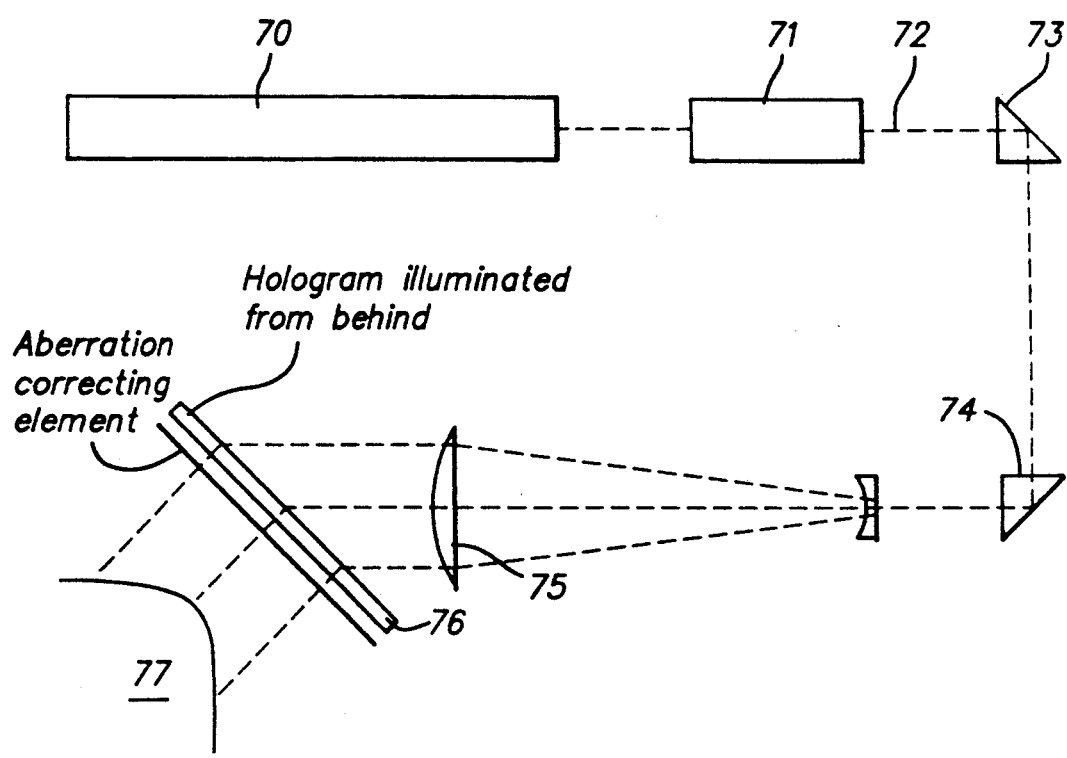

FIG. 7 is a graph showing the variation in attenuation length with wavelength for distilled water, FIG. 8 is a diagram of an experimental arrangement for measurement of beam scattering in water, FIGS. 9 (a) and (b) show respectively polarisation ratio and total irradiance against scattering angle, FIG. 10 is an experimental arrangement for measurement of depolarisation at a rough surface, FIGS. 11 (a) and (b) show respectively polarisation ratio and total irradiance against scattering angle for a rough surface, FIGS. 12 and 13 a photographs taken from different objects in water, FIGS. 14A, 14B and 15 to 18 are explanatory ray diagrams, FIGS. 19 (a) and (b) are diagrammatic arrangements of holographic camera, and FIG. 20 is an optical arrangement for reconstruction of holographic images.

Figure 1:
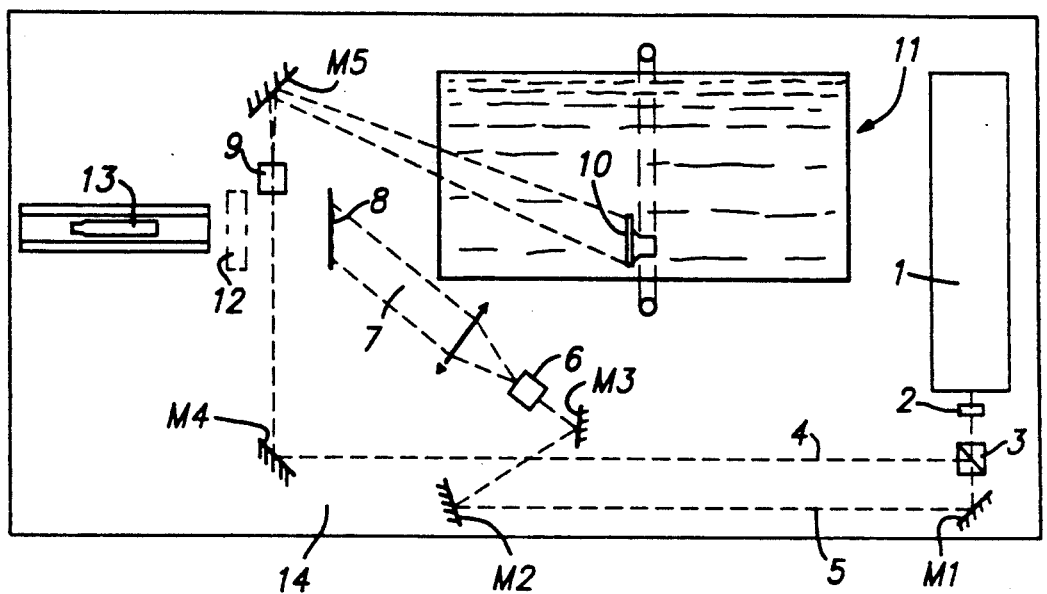
FIG. 1 shows an optical arrangement for recording holograms.

Referring now to the drawings, FIG. 1 shows an optical arrangement for the recording of holograms. An argon ion laser 1 with a shutter 2 serves as radiation source. A variable beam splitter 3, separates the radiation into recording and reference beams 4,5 respectively. The reference beam passes by way of mirror M1,M2,M3 through a microscope objective and pin-hole spatial filter 6 to produce a collimated beam 7 which illuminates a holographic plate 8. The recording beam 5 passes by way of mirror M4,M5 and microscope objective and pin-hole filter 9 to illuminate a moveable target 10 in a water tank 11. A real image 12 of the hologram is viewed in air by means of a travelling microscope 13. The whole arrangement is mounted on a pneumatically supported table 14 to reduce vibrations and extraneous thermal effects.

The primary monochromatic aberrations to be found in any imaging system are those of spherical aberration (S), chromatic aberration (C), astigmatic aberration (A), field curvature (F), and distortion (D). The relative coefficients of aberration for each of the above can be given in terms of the cartesian co-ordinates relating to object, reference and reconstruction wave positions with respect to the hologram plane.

It can be shown that the aberration coefficients, S, C, A, F and D can be minimised if two conditions are met, namely, that (a) the reference and reconstruction wavefronts are both located at infinity, that is, they should be collimated, and, (b) the wavelength of the reference wave must equal that of the reconstruction wave.

Correspondingly these conditions yield the fact that when reconstructed as above the lateral, longitudinal and angular magnifications of the real image will all be equal to unity.

The above arguments apply to paraxial region. For non-paraxial case more rigorous formulations apply. However, we can realistically assume that if we meet the above conditions then all aberrations will be reduced to a minimum.

In real-image reconstruction, image resolution is limited, in theory, only by the quality of the reproduced hologram. The resolution of a holographic image is usually defined as the ability to distinguish two points on a hologram separated by distance r, given as, $$r = 1.22 \lambda z / D \qquad (1)$$

where $\lambda$ is the reconstruction wavelength, z is the separation between hologram and reconstructed image and D is the effective aperture of the hologram. This equation is the standard relationship of optics which defines the resolving power of a lens. A lens and a hologram of equivalent diameters will produce the same theoretical resolution. Because of its reduced susceptibility to optical aberrations, the hologram will produce the more highly resolved image.

The above equation is usually expressed as a resolving power (R) in line pairs per millimetre (lp/mm) by reciprocating and dividing by $10^3$. Hence, we have $$R = 10^{-3}/(1.22 z \lambda / D) \text{ [lp/mm]} \qquad (2)$$

In holography the presence of speckle effects introduced by the coherence of the light and the finite aperture of the viewing system influences the resolving power. The speckle size sets the lower limit to the resolution. In practice, R is reduced by a factor of 2 to 3 to take account of this.

The resolution obtained in this way assumes that we reconstruct with an exact conjugate of the reference beam, that the reconstruction wavelength matches that of the recording beam and that the emulsion is infinitesimally thin. Conversely, the resolution of a virtual image hologram is limited by the effective aperture of the viewing system.

Emulsion uniformity and substrate quality have a significant effect on the quality of the reconstructed hologram. Standard holographic plates supplied by the major manufacturers often exhibit a departure from flatness of up to a few hundred fringes. To improve the holographic image from such plates the reconstructed area can be apertured to cover that part of the plate exhibiting best flatness.

The quality of the recorded hologram depends to a large extent on the choice of photographic emulsion and processing techniques. The choice of emulsion falls between:

(a) Aofa 8E56HD and Ilford SP672

Both these films are sensitised for use with lasers operating in the blue-green region of the spectrum and feature fine grain with consequently low scatter and high diffraction efficiency.

(b) Agfa 8E75HD and Ilford SP673

These emulsions are similar to those mentioned above but are sensitised for work in the red region of the spectrum.

(c) Agfa 10E56HD and Agfa 10E75HD

These emulsions possess significantly larger grain sizes than any of the other emulsions and consequently need less exposure to light. The large grain size, however, reduces the resolving power of the film and they can therefore not be recommended for high resolution holography.

Chemical processing of the recorded interference pattern is a crucial step in the holographic procedure. Some of the factors which have to be considered include image brightness, image resolution, reconstruction wavelength, emulsion shrinkage and noise level.

Several processing procedures have been found to be suitable for processing of transmission holograms. These processes include:
(a) develop only
(b) develop and fix
(c) develop and bleach (rehalogenating)
(d) develop and bleach (reversal)
(e) develop, fix and bleach.

It has been established that for bright holograms on silver halide film bleaching is desirable in order to maximise the efficiency of the hologram. Some forms of bleaching, though, can result in non-uniform shrinkage of the emulsion, which will give rise to astigmatism in the reconstructed image. A rehalogenating bleach process, in which the developed grains of silver are reconverted to silver bromide, has been shown to be the most suitable process for holography giving rise to a bright image with low scatter. Because no silver is removed but is merely redistributed through the emulsion it is believed that this type of processing results in the dimensions of the emulsion remaining constant before and after exposure.

A preferred method for processing holograms includes the following steps:
Pre-wash: 2 min in de-ionised water at 20° C.
Develop: 2 min in Pyrogallol at 20° C.
Wash: 2 min in de-ionised water at 20° C.
Bleach: 2 min in Ferric EDTA at 20° C.
Wash 1: 10 min in de-ionised water
Wash 2: 2 min in 50/50 de-ionised water and methanol
Wash 3: 2 min in 100% methanol Tetenal Neofin Blue is prone to emulsion shrinkage and for more exacting work it can be replaced by a pyrogallol based developer such as Agfa-Gevaert GP62, the formulation of which is given in Table 1.

TABLE 1

| Part A | Part B |
| --- | --- |
| 700 ml water | 700 ml water |
| 15 g metol | 60 g $Na_2CO_3$ |
| 7 g pyrogallol | de-ionised water to 1000 ml |
| 20 g $Na_2SO_3$ | |
| 4 g KBr | |
| 2 g Na-EDTA | |
| de-ionised water to 1000 ml | |

Working solution made up as 1 part A+2 water+1 part B. The bleach formulation used was as in Table 2:

TABLE 2

700 ml water
50 g potassium bromide [KBr]
1.5 g boric acid
water to 1000 ml
2 g para-benzoquinone [PBQ] added just before use ...

An alternative bleach to the PBQ based one described above may be used because of its less toxic properties. The formula of this bleach is given in Table 3:

TABLE 3

700 ml de-ionised water
30 g ferric sulphate [$Fe_2(SO_4)_3$]
30 g EDTA di-sodium salt
30 g potassium bromide [KBr]
10 ml conc sulphuric acid [$H_2SO_4$]
de-ionised water to 1000 ml An alternative means of recording a hologram is to use thermoplastic film. Such film is commonly used in holographic interferometry. Its many attractive features include rapid electronic processing and reusability.

The requirement of recording underwater with subsequent laboratory reconstruction in air introduces additional factors to those mentioned above upon which image fidelity may depend. Such factors include
(a) thermal gradients in the water,
(b) turbulence in the water,
(c) polarisation effects
(e) scattering
(f) absorption, and
(g) mismatch between the refractive index of the medium in which the hologram is recorded and that in which it is replayed.

Inevitably these processes result in an image which will have a resolving power below that of the equivalent situation in air. The image will also possess optical aberrations brought about by recording in one refractive index medium and replaying in another.

A range of lasers were used in the experiments, as follows,

(a) Argon-ion

Manufactured by "Lexel" as Type 90-4. Contains oven stabilised etalon and delivers up to 1.5 W, continuous power at 514 nm, single frequency mode.

(b) Frequency doubled Nd-YAG

Manufactured by "Quantel". Delivers 250 mJ in a pulse of 15 ns duration at 532 nm, single-longitudinal mode (SLM). A second output of 50 mJ is also available and serves as a reference beam.

(c) Ruby

Manufactured by "JK Lasers". Delivers up to 1 J in a 30 ns pulse at 694 nm, SLM.

Agfa 8E56 plates were used with argon and YAG lasers and Agfa 8E75 plates and film were used with the ruby laser. Chemical processing of the recorded holograms was carried out according to the procedures outlined above.

Whenever real image reconstruction was envisaged, the reference and reconstruction beams were collimated using an SORL Fourier lens. This lens had a focal length of 300 mm, an f/5 aperture and a wavefront accuracy specified as better than $\lambda/8$ over its central 38 mm at 514 nm. Collimation of the beams were achieved to better than 2 mrad. Reference beam angles of 30° to the normal with the holographic film were typical. This ensured that the spatial frequency of the system was well within the cut-off frequency of the film.

A series of holograms were recorded aimed at establishing the influence of thermal gradients and turbulence in the water on the fidelity of the reconstructed image. Since thermal gradients and turbulence can both be linked to local changes in the refractive index of the water it is to be expected that they will have local influences on the path length of light travelling through the water. Such an effect, if severe enough, could appear in the hologram as localised interference fringes and obscure the inspection area. Although the "look around" properties give some measure of compensation for this.

To simulate "worst-case" conditions, an immersion heater operating at around 90° C. was placed in the observation tank in front of the targets. A series of holograms at exposure times of 20 s down to 150 ms (the shortest obtainable with the above set-up and amplitude processing) showed that as expected the number of fringes recorded across the field of view decreased with exposure duration.

Figure 2:
FIG. 2 is a photograph of a hologram taken using the arrangement of FIG. 1.

A photographs of one such hologram, taken from virtual image reconstruction, is shown in FIG. 2 corresponding to an exposure duration of 150 ms. Spot temperatures in degrees Celsius at various points in the water are also shown (numerals 18-21). In any field situation, though, the use of a pulsed laser with pulse durations of 10 to 50 ns would be essential because of the mechanical stability conditions required by holography. It would appear unlikely that, in these short time scales, thermal variations of the magnitude likely to be encountered offshore would result in the appearance of secondary fringes in the hologram. These conclusions were verified by the short analysis which follows and by a series of similar holograms taken with both pulsed ruby and frequency-doubled YAG lasers.

The mechanism by which interference fringes are formed is well known. A change $\lambda/2$ in path length travelled by a given ray between two consecutive exposures will give rise to a dark fringe in the hologram. In this particular case the path length change is brought about by local temperature variations causing a change in local density and hence in local refractive index of the water.

Assuming first order fringes, the refractive index change can be linked to path differences by $$x \Delta n = \lambda/2 \quad (3)$$

where x is the length of medium over which the path length changes, $\Delta n$ is the refractive index change and $\lambda$ is the wavelength of the laser.

Equation 3 can be linked to the temperature by assuming that, firstly, the spatial variation in refractive index is a step function and, secondly, that refractive index is a linear function of temperature over a suitably narrow range. Hence, we have $$n = aT + b \quad (4)$$

where a and b are constants.

For small variations in n and T, we can say that $$\Delta n/\Delta T = a \quad (5)$$

and hence, $$ax \Delta T = \lambda/2 \quad (6)$$

Equation (6) accordingly relates the appearance of fringes to temperature changes.

It has been shown that a temperature change of 20 degrees in pure water at a nominal value of 20° C. will give rise to an approximately linear change in n of 0.0008, yielding a value of $40 \times 10^{-6} °C^{-1}$ for the constant a. This linear approximation is reasonable since a correlation coefficient of 0.96 was obtained for published values of n and T over this range. Hence, for a wavelength of 514 nm and assuming that the refractive index changes over a 2 cm path, we obtain $$\Delta T = 0.3° C.$$

Thus one dark fringe will appear for a temperature change of 0.3° C. over a 2 cm path of water. In contrast to the above the fringes which appear in a single exposure hologram correspond to the change in refractive index integrated over the exposure duration and may be regarded as an ensemble of double exposure holograms. Consequently the number of fringes over the field of view must decrease as the exposure duration decreases as previously concluded.

An order of magnitude calculation based on the previous analysis shows that unrealistically large temperature would need to occur before such fringes would appear in the hologram.

Figure 3:
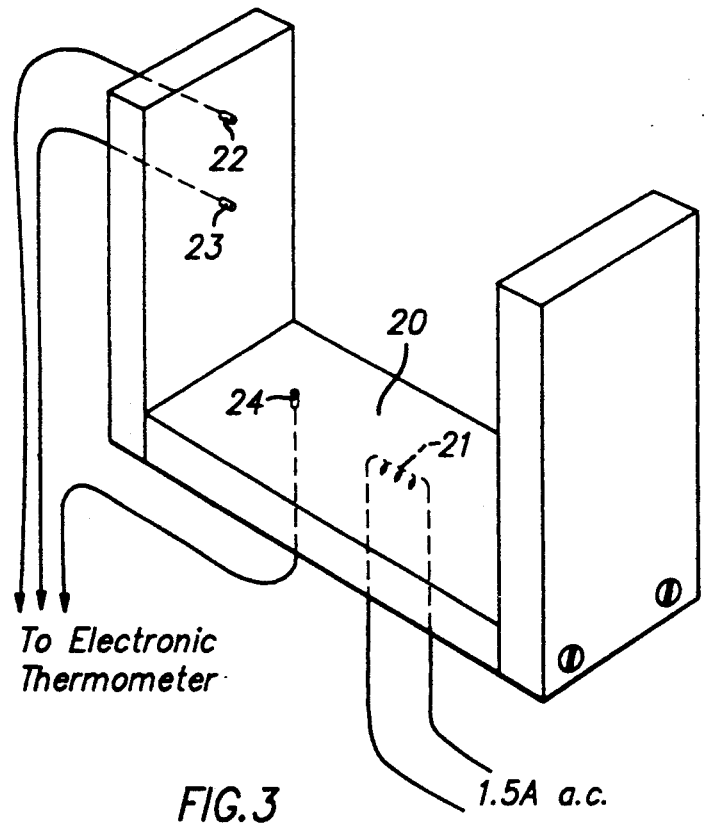
FIG. 3 is a diagrammatic representation of a cell used to produce interferograms
Figure 5:
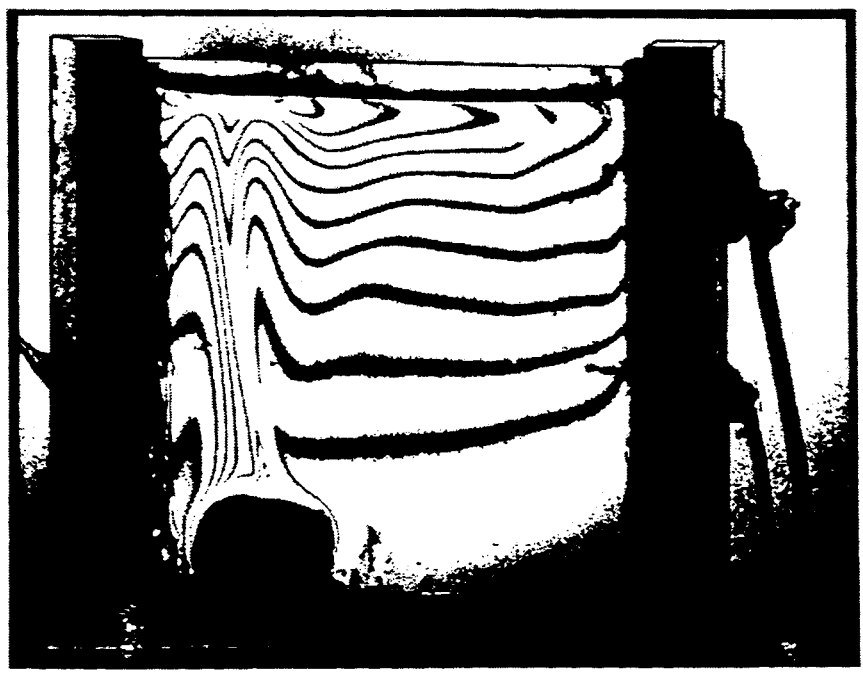
FIG. 5 is an interferogram produced using this arrangement.
Figure 4:
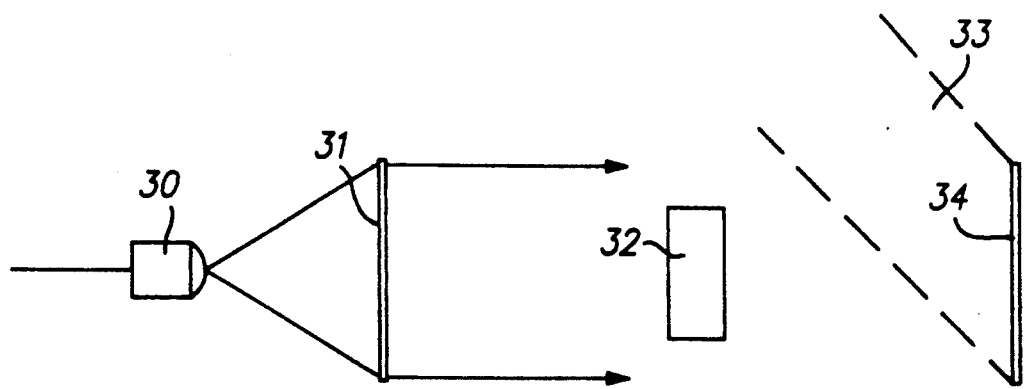
FIG. 4 is an optical arrangement used with the cell of FIG. 3.

A specially constructed target consisted of a water filled cell 20 as shown in FIG. 3 containing a small heating element 21 and three thermocouples 22,23,24 was used to verify the above analysis. Using the optical arrangement shown in FIG. 4 comprising a lens 30, a diffusing screen 31, a water cell 32, a collimated reference beam 33 and a holographic plate 34, a double exposure hologram was recorded with the heater off and on. A photograph taken from a real image reconstruction of the hologram is shown in FIG. 5. By examining the resulting hologram under real image reconstruction the finite depth of the fringes could be seen. The measured temperatures indicate an actual thermal variation of 0.25° C./fringe which is in reasonable agreement with the previous analysis.

Like thermal gradients, the quality of underwater holograms may also be affected by the presence of turbulent flow in the water. In such situations, turbulence may arise from, for example, surface waves or currents around structural members or, perhaps more severely, from the operation of underwater inspection vehicles. Since turbulence may be interpreted as localised fluctuations in the velocity and pressure of the water, such variations would be expected to cause minute changes in optical path length resulting in the appearance of fringes in the hologram.

Figure 6:
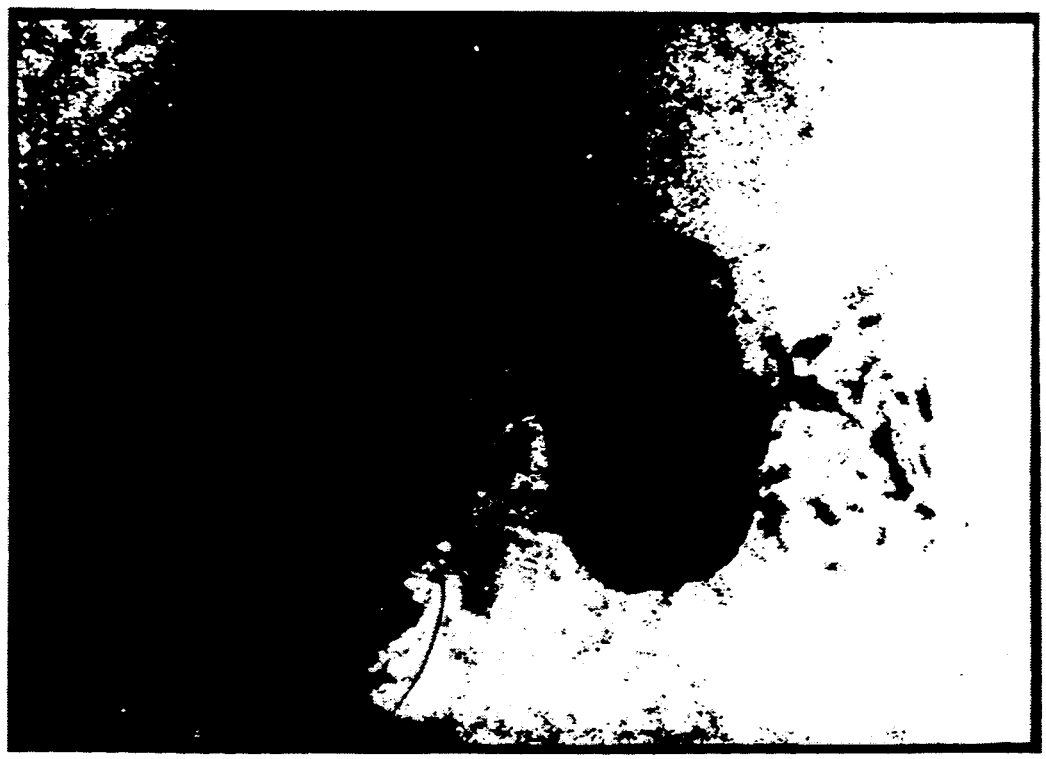
FIG. 6 is a photograph taken from a real image reconstruction of the hologram of a revolving paddle.

One simulation of the effects of small scale turbulence, utilising a paddle revolving at approximately 1 Hz. is shown in FIG. 6. A few localised fringes are visible in the hologram. We can interpret the occurrence of these fringes as arising from the small amounts of local heating which must inevitably be produced by the velocity and pressure fluctuations in the water.

A similar analysis to that conducted for thermal gradients again indicates that in the situation likely to be encountered, offshore turbulence is unlikely to be a problem if short pulse lasers are used in hologram recording. Confirmation of this conclusion was obtained by taking holograms similar to those outlined above using both pulsed ruby and frequency-doubled YAG lasers.

All our preliminary holograms showed that bright clear images could be recorded of objects submerged in clear tap water. Sea water, however, with its salinity, suspended matter and micro-organisms presents a different situation. It is to be expected that under these circumstances scattering and absorption of light will have an influence on image brightness and apparent contrast of the subject. The extent of these phenomena in a given medium dictates the limit of visibility.

Scattering of light in an attenuating medium occurs when light interacts either, with particles suspended in the medium or, with inhomogeneities in the medium and consequently is deviated from its original path. In sea-water, transparent micro-organisms and suspended particles are much larger than the wavelength of light. Thus, unlike atmospheric scattering, scattering in sea-water is relatively constant over the visible spectrum. Absorption, on the other hand, is a thermodynamic process which results in the loss of irradiance of a beam of light as it traverses the medium and, as such, is strongly wavelength dependent. Other mechanisms such as fluorescence and photosynthetic absorption are small enough to be negligible.

When a collimated beam of light, with an initial irradiance $E_o$. passes through an attenuating medium, its irradiance $E_x$ at a distance x from the source is given by $$E_x = E_o \exp(-ax) \qquad (7)$$

where $a$ is the total attenuation coefficient. In water this coefficient is primarily the sum of attenuation due to scattering and that due to absorption. Typically, $a$ is of the order of $0.04$ m$^{-1}$, $0.20$ m$^{-1}$ and $0.34$ m$^{-1}$ for distilled waters coastal water and bay water respectively, all measured at 510 nm.

A more convenient way of expressing the attenuation of light is in terms of the "attenuation length" ($a^{-1}$) of the medium. The attenuation length is defined simply as the reciprocal of the attenuation coefficient and is expressed in "meters". Expressing the above figures in terms of attenuation length we have about 25 m for distilled water, 5 m for coastal water and about 3 m for bay water. It is generally agreed that the visibility limit of a dark object in water, near the surface in daylight is around four attenuation lengths.

The variation in attenuation length with wavelength for distilled water is shown in FIG. 7. The peak transmission occurs at around 480 nm. In sea-water, with its dissolved yellow substances caused by breakdown of animal and plant matter, we would expect this "transmission window" to shift towards the green region of the spectrum. At this peak about 60% of attenuation is due to scattering by particulate matter, whereas the rest is due to absorption.

The above behaviour indicates that for long-range underwater work, lasers such as argon-ion or frequency-doubled Nd-YAG, which have wavelengths in the blue-green region of the visible spectrum, will be the most suitable choice.

An effect of scattering common to all underwater optical imaging systems is the reduction in contrast and apparent brightness of the image. Two mechanisms are responsible for this: firstly, light from the irradiating beam can be backscattered towards the film creating a "luminous fog" through which the target is viewed; secondly, light reflected from the brighter parts of the target is forward scattered into the line of sight of darker parts of the target. Both mechanisms cause the darker parts of the object to appear brighter than they really are relative to the bright areas resulting in a decrease in contrast of the image. This loss of contrast ultimately degrades resolution.

In holography, image contrast is further dependent on fringe visibility in the recorded hologram, which is, in turn, dependent upon the relative planes of polarisation of the interfering beams. When recording a hologram, only object light which is polarised in the same plane of vibration as the reference light can actually interfere to produce the required hologram. Conventionally the object and reference beams are both polarised in the vertical plane of the electric vector. However, light scattered back towards the film plane from small particulates in the water may suffer some depolarisation resulting in some light of the wrong polarisation reaching the film. Although this light cannot contribute to the recording of the hologram it does raise the overall background level of the film thereby reducing the signal-to-noise ratio.

Preliminary investigation of the holograms taken earlier did indeed indicate a loss of brightness for holograms taken in sea-water over those taken in air. Measurements of the polarisation of the object beam irradiating the film showed it to contain a component of horizontally polarised light at around half the irradiance of the original vertical polarisation.

The magnitude of the depolarisation was studied using the arrangement shown in FIG. 8 consisting of a collimated laser beam 40 passing through a water tank 41, together with a moveable detector and prism 42. The irradiance and state of polarisation of light scattered from a collimated laser beam as it traversed a tank of sea-water was measured at various angles around the beam direction. The state of polarisation is expressed as the ratio of the irradiance of the vertical component, $E_V$, to the sum of both horizontal and vertical components, $E_V + E_H$, as $$p = E_V / (E_V + E_H) \qquad (8)$$

A value of p close to unity indicates a beam which is strongly vertically polarised, whereas, p tending towards zero indicates a strong degree of horizontal polarisation.

A graph of p and total irradiance. $E_H + E_V$, against scattering angle is shown in FIGS. 9(a) and 9(b) resp. The polarisation state of the straight through beam (0°) remained unchanged from its initial value of p very nearly equal to one indicating that the beam was not suffering any significant depolarisation. At angles greater than 10° the proportion of horizontally polarised light increased peaking at a scattering angle of about 90°, corresponding to a p-value of 0.62. Light backscattered at angles greater than 90° contains as much as 30% of the horizontally polarised component, indicating that such light reaching the film would contribute to the overall background level. The overall irradiance of the light decreases as the scattering angle increases. The high intensity of scattered light which is visible at these small forward angles is believed to be due to transparent plankton having a refractive index close to that of water and small point-to-point variations in refractive index caused by thermal effects and salinity gradients as discussed earlier. Wavefronts passing through sea-water will, therefore, be distorted and the resolving power of any viewing system will be expected to deteriorate over its comparable performance in air. Small angle scatter is not expected to have much effect on the polarisation of light. Scattering from larger particles, however, will have some depolarising effect and this would account for the lower values of P obtained at larger angles.

Another likely cause of depolarisation is that due to the light reflected from the target itself. In a series of experiments aimed at establishing the magnitude of this effect, parallel laser light was reflected from rough surfaces 46 such as corroded aluminium and ground glass and the light scattered at various angles monitored using the arrangement shown in FIG. 10 comprising a collimated laser beam 44 and polarisation detector 45. A graph of p and total irradiance, $E_H + E_V$, against scattering angle is shown in FIG. 11. As expected, significant depolarisation, up to 20%, of the light is experienced at all scattering angles. The extent of depolarisation, however, decreases as the scattering angle increases, with p eventually reaching a maximum when the scattering angle equals that of the angle of incidence, that is at 45° to the normal. The total irradiance is also a maximum at this angle. Hence, at that angle the beam suffers the least amount of depolarisation.

The above effects can be minimised if a vertically orientated linear polariser is placed in front of the film plane so that only light polarised in the required plane reaches the film. Hence the background irradiance will be reduced. Furthermore when exposure values are estimated a similar filter placed across the exposure meter will ensure that only the correctly polarised will be measured.

Advantageously, the concepts of circular polarisation can be exploited to improve image contrast. Light which is circularly polarised in a particular direction changes its "handedness" each time it is reflected. For example, light which is originally "left-hand" polarised will become "right-hand" polarised after one reflection and will return to "left-hand" polarised after two reflections. Generally, light backscattered from particulates in sea water will be reflected once, whereas, light reflected from rough objects will experience more than one reflection. If left-hand (say) circularly polarised light is used in object illumination, scattered light will be predominantly right-hand polarised and light reflected from the object scene will possess an approximately even mix of left- and right-hand components. Placing a right-hand polariser at the film plane will ensure that only light reflected from the object will reach the film. Thus the contrast of the image will be improved by removing unwanted scattered light. This process, though, is obviously wasteful of energy since about half the light reflected from the object is thrown away. The process, though, will only be effective with rough objects, specular reflectors will experience only one reflection and hence will suffer a reduction in contrast. A further quarter-wave plate is needed behind the circular polariser to linearise the light.

Additional techniques for the reduction of back-scatter which have been found advantageous in underwater photography include "volume reduction" and "range gating". In the former, the scattering volume which is common to both source and receiver fields is reduced by increasing the separation between source and receiver. For a holographic camera this would be accomplished by increasing the distance between the emitted object beam and the film plane. In practical terms this solution might put unreasonable constraints on system geometry. Range gating is one solution to the problem of backscatter. The receiver is electronically gated in conjunction with the use of a pulsed laser as the illuminating source. The photosensitive medium is exposed to light only at the instant the pulse reflected from the target reaches it and then switched off. In this way, any light backscattered towards the film by particulates in the water will not be seen by the receiver. An alternative concept which can be exploited in holography is known as "coherence gating". In this technique, the reference beam and object beam paths are matched to within the coherence length of the laser. The coherence length is adjusted to correspond to the distance between holographic film and subject. Hence only light reflected from the object will meet the conditions for interference, light backscattered from the water will not meet the conditions and will, therefore, not be recorded on the hologram.

To compare and contrast the resolving power of holograms recorded of underwater objects with the equivalent holograms taken in air the optical arrangement as previously shown in FIG. 1 was used. Holograms were recorded, both, with and without the observation tank in place. The target for all resolution measurements was a standard resolution chart possessing a series of vertical and horizontal bars in the range 1 to 228 lp/mm. The resolution of the reconstructed real image was measured using a travelling microscope fitted with a 10× Ramsden eyepiece with an overall system magnification of 20×. All holograms were recorded on Agfa holographic plates type 8E56HD and processed using a pyrogallol based developer (Agfa formulation GP 62) and bleached in a para-benzoquinone (PBQ) based bleach (Agfa formulation GP 432).

Holograms were recorded with the unexposed plate in the plate holder and the resolution chart in position A of the optical arrangement. After processing according to the method outlined above the hologram was rotated through 180° and illuminated through the back of the plate. The corresponding real image is reconstructed in position A'. Collimation of reference and reconstruction beams was accomplished using a lens with a focal length of 300 mm and aperture of f/5. The wavefront accuracy is λ/8 over the central 38 mm of its aperture at 514 nm. In order to illuminate as large an area of the holographic plate as possible the entire lens aperture was used to expose a roughly elliptical area of 65 mm×75 mm of the film. The lens was collimated to an estimated divergence of no more than 2 mrad. A reference beam to optic axis angle of 30° kept the spatial frequency of the system below that the cut-off frequency of the film.

The laser used in the experiments was an argon-ion (Lexel type 90-4) delivering up to 1.5 W single frequency at 514 nm. The entire set-up was mounted on a vibration isolated table.

A number of holograms were recorded in order to monitor the optical resolution achievable when recording the holograms underwater. Initially, two holograms were taken under the conditions outlined above but with no observation tank in position. In other words the holograms were recorded entirely in air in order to establish a reference point. These holograms were taken at target-to-film distances of 550 and 1000 mm respectively. A second pair of holograms were the recorded at the same target-to-film distances, but with a perspex observation tank in place. In this case the perspex wall was nominally 10 mm thick and the distance between the front wall of the tank and hologram plane was 240 mm. A third pair of holograms were recorded as above but with turbid water in the observation tank. In this situation the holograms were recorded at in-water paths of 300 and 750 mm respectively. In all cases the film, perspex interface and target were parallel to each other and on the same optic axis.

The experimentally obtained resolving powers are shown in Table 4. As a reference point a resolution of 57 lp/mm was measured directly on the original resolution chart using the measuring microscope described earlier when illuminated by reflected laser light at 514 nm.

TABLE 4

| Resolving Power Measured from Underwater Holograms | | | |
|---|---|---|---|
| Location of target | Total film to target dist | Path dist of target in water | Measured Resolution |
| In air | 550 mm | | 22 lp/mm |
| In air/in tank[1] | 550 mm | | 20 lp/mm |
| In water/in tank[1] | 550 mm | 300 mm | 18 lp/mm |
| In air | 1000 mm | | 9 lp/mm |
| In air/in tank[1] | 1000 mm | | 8 lp/mm |
| In water/in tank[1] | 1000 mm | 750 mm | 7 lp/mm |

Note
[1]This distance includes a film plane to tank separation of 240 mm and a nominal tank wall thickness of 10 mm.

The figures obtained for resolving power of underwater holograms show a decrease over the reference holograms recorded in air as, firstly, a perspex interface is placed in the optical path and then, secondly, a water interface is added to the path. The ultimate reduction in resolving power is from 22 to 18 lp/mm. These figures should be contrasted with those obtained by underwater photogrammetry which indicate a resolving power of around 0.5 lp/mm for similar viewing conditions in sea water.

In the field, measurement of resolving power is not a very meaningful figure considering that the object may be rough, poorly reflecting and low contrast. Being able to measure a particular set of bars on a resolution target does not really help in determining whether or not a particular surface feature can be visualised using holography. To illustrate this a hologram was taken of an engineering test piece: a polished titanium block with a stress-induced crack in it. The hologram was taken under the conditions outlined above with a total object-to-film distance of 550 mm and a distance in water of 300 mm. A photograph taken from the reconstructed real image is shown in FIG. 12. The crack, which was measured to be 40 μm across the root, is clearly visible. A reconstruction from a second hologram, taken under identical conditions to those above, of a corroded weld specimen is shown in FIG. 13.

A further range of holograms were taken with the objects submerged in "live" sea water. The total attenuation length, $\alpha^{-1}$, of the water was measured, using a simple arrangement of collimated laser beam traversing the water filled tank, as 0.56 m at 514 nm. This attenuation corresponds to a light loss of some 80% over a 1 m beam path. The path was through a 400 mm length of sea water. In this unoptimised system, a real image resolution of 5 lp/mm was determined for the central on-axis parts of the object.

When a hologram is recorded underwater and replayed in air, the reconstructed image will suffer from optical aberrations due to the difference in refractive index between the two media. For points on-axis the image will replay closer to the film plane in the simple ratio of the refractive indices. This latter fact will be modified by the presence of the perspex interface.

Measurements of the image shift were made using the optical arrangement shown earlier, but this time provision was made to move the target position laterally with respect to the optic axis. For each hologram a ground glass screen was used to view the real image and the reconstructed image position determined.

Table 5 shows the measured image shifts for a number of target locations.

TABLE 5

| Image Shift Measured from Underwater Holograms | | | | | |
|---|---|---|---|---|---|
| Object Position | | Image Position | | Image Shift | |
| On-axis | Off-axis | On-axis | Off-axis | On-axis | Off-axis |
| 417 mm 0 mm | 0 mm | 309 mm | 0 mm | 108 mm | |
| 417 13 | 230 | 288 | 227 | 129 | |
| 417 47[1] | 435 | 149 | 388 | 268 | |
| | | 194 | 432 | 223 | 3[1] |

Note
[1]In this case two image positions were obtained, the first one corresponding to the vertical bars on the resolution target and the second one corresponding to the horizontal bars of the target.

The data shows that for on axis points the image shift is in accordance with the shift predicted from a simple refractive index ratio. As the target, however, is moved laterally with respect to the optic axis the measured image shift increases beyond that expected by simple theory. The reasons for this being that now the light rays travelling from the hologram to the image position are traversing paths which are substantially different from those encountered in recording. In particular, the refraction of light encountered at the air/perspex/water interface during recording does not occur in replay. The replayed rays do not converge to the same point from which they emanated in recording. As a consequence of this, two distinct image points are formed on reconstruction: one for the horizontal resolution bars and one for the vertical resolution bars. In other words the image is astigmatic. As the object is moved further from the optic axis the difference between the two image positions increases.

Analysis of underwater holograms has shown that when a real image is reconstructed in a medium of lower refractive index (air) from a hologram originally recorded in a medium of higher refractive index (water) the resulting image will suffer from optical aberrations. The origins of this may be understood by reference to FIGS. 14A and 14B which shows the path of two rays emanating from an object point, P, located on the optical axis with respect to the hologram centre, O. The refraction suffered by these two rays at the media boundaries serves to produce a virtual image of P located at point, P'. Hence on reconstruction of the real image, the image of point P will be located at point P' a distance OP' in front of the hologram. The actual position of P' cannot be precisely located by simple tracing of the path$ of two rays as shown, since, any other two rays which subtend a different angle will locate P' at a different position along the optic axis. This situation is analogous to spherical aberration produced by a lens. In practice, the position of P, will be determined by identifying the circle of least confusion located at the waist of the ray bundle formed by tracing the path of all rays through the three media.

Using a paraxial approximation, the expected image shift for on-axis point objects has been calculated and confirmed to a limited extent by experiment as discussed above.

For points off-axis, the situation is complicated by the appearance of astigmatism in the image as discussed in the following section.

Experiments involving the reconstruction of real images from holograms of off-axis point objects in water have revealed a considerable degree of astigmatism. The origins of this astigmatism would appear to lie in the fact that the hologram is being recorded in one refractive index medium and being replayed in another.

Figure 15:
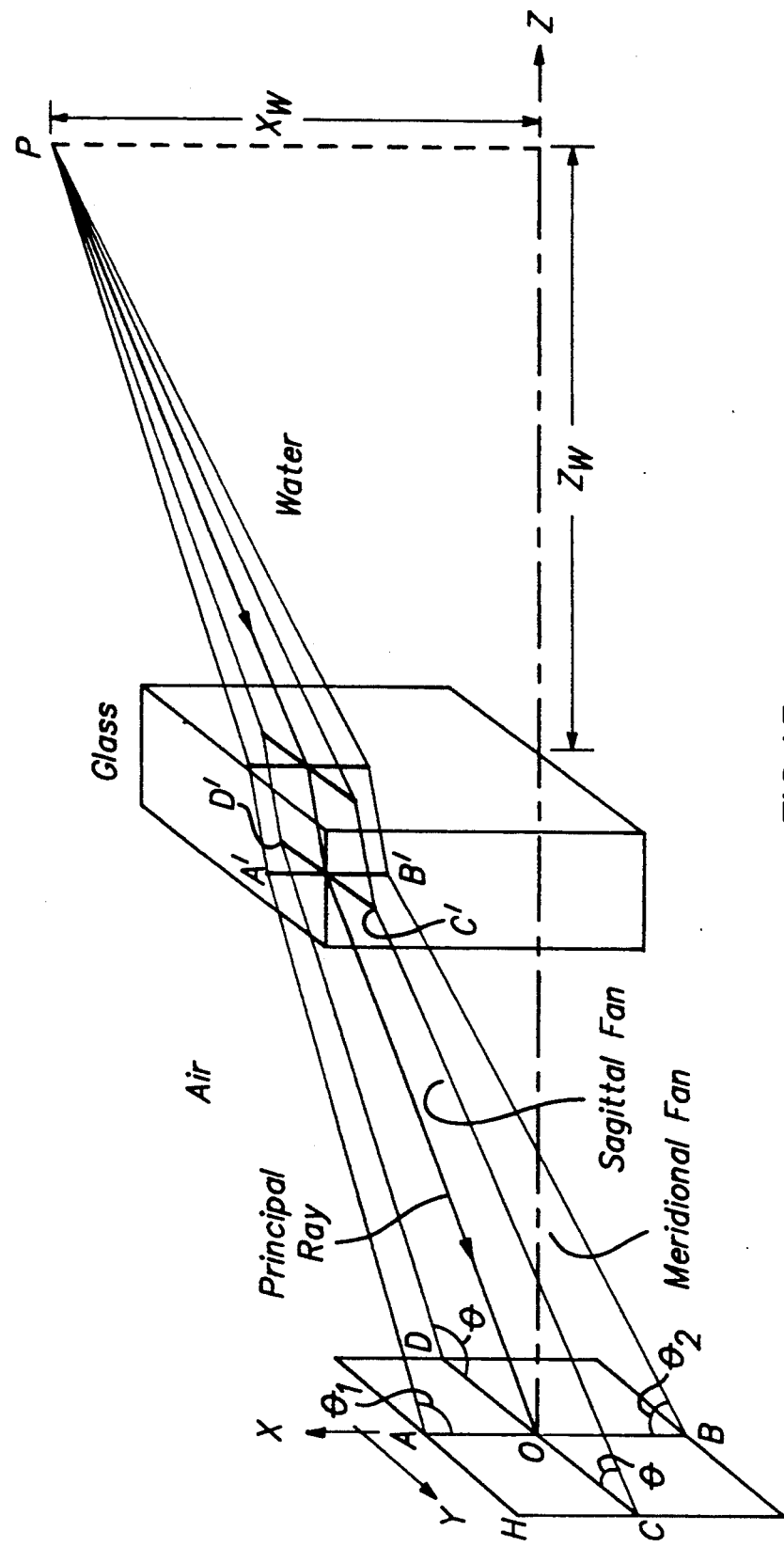

FIG. 15 shows the basic geometry adopted in recording the hologram. The origin O of the co-ordinate system is taken as the centre of the hologram H. The object point P is located off-axis in the xoz plane at an arbitrary distance $z_w$ in water. Shown in the figure is the refraction of the meridional rays, PA and PB, the sagittal rays, PC and PD, and the principal ray, PO, at the water/glass and glass/air interfaces. For an object point off-axis in only one plane, the two sagittal rays will be symmetricaly orientated with respect to the principal ray, thereby subtending equal angles with the refracting surfaces and, hence, with the hologram plane. Whereas, the optical path lengths of the sagittal rays are equal in each of the three media this will not be the case for the tangential rays, PA and PB. In this case, the angles subtended by the rays at the hologram plane OAA' and OBB' are unequal. This situation is identical to that pertaining to the origins of astigmatism in a lens system.

In the context of holography, the aberrations discussed will be present in the reconstructed real image. The source of these aberrations is, however, not connected with the holographic recording process. In order to observe the astigmatic effects outlined above it is only necessary to view, from a position in air, an object immersed in water. The holographic process faithfully records the astigmatic image which can be seen by any observer.

In the absence of significant monochromatic aberrations a point image would be observed at an equivalent position in the negative x and z position. Upon illumination of the hologram with the reference beam the original wavefronts emanating from the point object are reconstructed, maintaining their original orientation with respect to the holographic plate. Thus the meridional rays AA' and BB' and sagittal rays CC' and DD' proceed outwards from the hologram plane in the $(-x,-z)$ direction and, failing to meet any refracting surfaces, form a point image at their intersection. However, the previous analysis of the recording stage shows that it is highly unlikely that the meridional and sagittal rays will come together at a common focal point. The reconstructed image may be expected to exhibit some degree of astigmatism. As might be expected from geometrical considerations this astigmatism has been found to disappear for axial object points leaving, in this case, only spherical aberration to consider.

The variation in path lengths from the object point via the refracting surfaces to the hologram plane is analogous to the zone concepts of lens imaging. The astigmatic nature of off-axis point images is, therefore, not unexpected.

In considering the aberrations associated with viewing a point object located in water it is important to gain an impression of how the degree of aberration varies with experimental parameters. This analysis is outlined in the following section with particular reference to the determination of the location and difference between the astigmatic images.

FIG. 16 shows the refraction of a ray at water/glass and glass/air boundaries. A ray originating from a point object P located in the water suffers refraction at both water/glass and glass/air interfaces and passes through a point R located in air. The angle subtended by the refracted ray to the normal as it leaves the point P in water is denoted by $\theta_w$, $\theta_g$ is the angle subtended by the ray to the normal at the water/glass interface and $\theta_a$, is the angle subtended by the ray to the normal at the glass/air boundary. The co-ordinate distances along the optic axis in the respective media are denoted by $z_a$, $z_g$ and $z_w$ for air, glass and water. Tracing the ray back through the media as if refraction were absent it appears to meet the optic axis at a point S.

An equation defining this ray may be given as a function of the angle $\theta_a$, as $$\theta_a = \sin^{-1}[(n_w/n_a)\sin\theta_w] \tag{9}$$

More usefully the ray path may be defined in terms of the location of the point R above the optic axis. Hence, $$y_a = z_a\tan\theta_a + z_g\mu_{ag}\sin\theta_a[1 - (\mu_{ag}\sin\theta^2)]^{-\frac{1}{2}} + z_w\mu_{aw}\sin\theta_a[1 - (\mu_{aw}\sin\theta_a)^2]^{-\frac{1}{2}} \tag{10}$$

where $\mu_{ag} = n_a/n_g$ and $\mu_{aw} = n_a/n_w$

Equation 10 may be solved by iteration and a value determined for $\theta_a$ relating to a given point R.

The ray emanating from P is just one of a family of such rays, which depend on the observer's viewpoint, each of which intersects the optic axis at some point S. The position of S will get progressively closer to P as the divergence of the ray PS decreases. Consider a pair of rays equidistant from, but infinitesimally close to R in the meridional (yz) plane of FIG. 14. These two rays will intersect at a point T at some distance yc above the optic axis. Adjacent pairs of rays will map out the loci of all virtual image positions and describe a caustic curve as shown in FIG. 17. Hence it can be seen that two image positions are obtained for each ray, one on the optic axis (the sagittal image) and one on the caustic curve (the meridional or tangential image). The equation defining the caustic curve, thus contains all the information required to locate the astigmatic images associated with viewing the point P from any given location in air. It should be realised that if the position of best focus is being looked for in reconstruction of the hologram, the observer will select the point where the ray bundle converges to its minimum diameter. This is the circle of least confusion and it will occur somewhere between the two astigmatic image positions.

In three dimensions, the loci of virtual image positions form a surface which is obtained by rotating the curve of FIG. 17 about the z-axis. The shape of this virtual caustic surface is a result of the increasing divergence of the refracted rays with increasing distance from the z-axis. By virtue of this rotational symmetry the projected rays can be seen to form a series of cones whose apex lie at increasing distances along the z-axis with decreasing radial distance of the projected rays from the z-axis measured in the plane of the media interface. The locus of intersection of any two adjacent cones (a circle) represents a cross-section of the caustic surface in a plane perpendicular to the z-axis. The intersections of an infinite series of such cones can be considered to generate the entire caustic surface.

Since the ray RS is actually a tangent to the caustic surface as shown in FIG. 16, it is possible to express the co-ordinates of any point (yc′ zc) of the point T on the caustic surface as a function of $\theta$a, as follows, $$z_c = z_g\mu_{ag}\cos^3\theta_a[1 - (\mu_{ag}\sin\theta_a)^2]^{-3/2} + z_w\mu_{aw}\cos^3\theta_a[1 - (\mu_{aw}\sin\theta_a)^2]^{-3/2} \quad (11)$$

$$y_c = z_g\mu_{ag}(1 - \mu_{ag}^2)\sin^3\theta_a[1 - (\mu_{ag}\sin\theta_a)^2]^{-3/2} + z_w\mu_{aw}(1 - \mu_{aw}^2)\sin^3\theta_a[1 - (\mu_{aw}\sin\theta_a)^2]^{-3/2} \quad (12)$$

from a given observation point R in air, Equations 10, 11 and 12 permit a determination of the astigmatic image points T and S and hence the difference in location between the two images. The extent of the sagittal and meridional line images may also be determined.

In any practical arrangement where a point object P in water is viewed from an observation point in air the viewing aperture, in our case the hologram, will have finite dimensions. The astigmatic images consist of two separate line segments possessing finite length and width. These dimensions are determined by those rays of the ray bundle associated with the extended aperture in the meridional and sagittal focal planes. If the previous analysis is applied to a point at the centre of the aperture the location and separation of the line images may be determined since the image points T and S locate the centres of both line images. Since often an evaluation of the astigmatic difference is of primary concern, the point image analysis detailed above proves sufficient as illustrated in FIG. 18. This information can be used in assessing the extent of the aberrations associated with imaging a finite object through glass and water.

Table 6 shows some data calculated for a hologram of 70 mm dimension.

TABLE 6

Analysis of Sagittal and Meridional Images for Underwater Holograms
(All dimensions are in millimeters)

| | | |
|---|---|---|
| Off-axis distance ($x_R$) | 500 | 100 |
| Object point co-ordinates (x,y,z) | 0,0,737 | 0,0,737 |
| Meridional image point (x,y,z) | 57.1,0,521.2 | 0.6,0,624.1 |
| Length of meridional line | 0,0,588.4 | 0,0,627.8 |
| Sagittal image point | 8.5 | 0.4 |
| Length of sagittal line | 10.6 | 2.5 |
| Astigmatic difference | 88.1 | 3.8 |

Where it is required to evaluate the dimensions of the line images or simply to visualise the convergence of rays from the aperture to the meridional and sagittal focal planes then Equation 1 provides the basis for a "spot diagram" analysis. The spot diagram serves as an illustration of the cross-section of the ray bundle by an array of points at various distances from the aperture. This technique serves as a useful method of visualising the image forming process.

On the basis of the foregoing analysis, we have devised cameras for long- and short-range under-water holography. By way of example, a long-range camera comprises an enclosure 50, having a port 51 for services and a window W for observation of an object (not shown). Windows 52,53 are provided for the recording beam 54a,b. The radiation source comprises an amplified laser 55 with beam splitters and associated half-wave plates 56,57 to derive the reference and recording beams. Prisms P1-P6 are provided to fold the various beams and constrain them within the available space. A collimating lens 58 and mirror 59 direct the reference beam through a filter assembly 60 on to a film 61 in a carrier 62. Circular polarisers 63,64 are provided in the path of the recording beams.

In the short-range camera shown in FIG. 19 (b), only one recording beam outlet is provided.

To produce successful holograms underwater requires careful selection of a laser with the required holographic performance and configuration for subsea use. Our experience indicates that two generic classes of laser are most appropriate for use in the specific holographic camera envisaged here, namely, the ruby laser or the frequency-doubled Nd-YAG laser. Of these two classes the ruby laser has its output in the red region of the optical spectrum ($\lambda=694$ nm) and is most commonly used in industrial holography. The frequency-doubled Nd-YAG laser, though rarely used in holography up until now, has an advantage over ruby for underwater use because its output wavelength is in the green region of the spectrum ($\lambda=532$ nm) and closely matches the peak transmission window of sea water. In normal circumstances for underwater holography of large volume subjects from long stand-off distances the Nd-YAG would be the ideal choice because of its wavelength advantage. For holography of a small subject at a short stand off distance, however, the wavelength advantage is not so significant and successful holograms could be made with a ruby laser. For that reason, holographic cameras could be envisaged using either Nd-YAG or ruby.

A significant advantage of current Nd-YAG laser over the ruby is in terms of its pulse repetition rate. Whereas a maximum repetition rate of 5 pulses a minute of holographic quality can be attained for ruby, YAG systems can be operated at around 1 Hz. Ruby lasers could perhaps be designed to operate at faster repetition rates but at a cost and size penalty.

The mechanism by which energy is pumped into the laser medium also has some bearing on the size and performance of the laser. Traditionally, solid state lasers are pumped by a capacitively discharged flashlamp lying parallel to the crystal. Depending on the performance required by the laser this generally implies the use of a physically large power supply. Recent progress in solid state laser technology has led to the development of the diode-pumped Nd-YAG laser. Such lasers appear to offer a more efficient and compact means of coupling energy into the laser medium.

The output energy required for successful underwater holography depends to a great extent on both the condition of the water and that of the object. We have found that for short-range holography an energy of 50 mJ would be sufficient, whereas, for long-range work an energy in excess of 250 mJ is needed. The 50 mJ of energy can be obtained using a laser with a single crystal rod (the oscillator). For higher energy, a second crystal is needed to amplify the oscillator energy.

With these points in mind a specific laser has been identified as being particularly attractive from the point of view of performance and size. The laser under consideration is a pulsed system using, at present, ruby as its active medium. In most aspects of its performance, for example, linewidth, pulse duration and output energy, it is at least as good as the competitive lasers from other manufacturers. In some aspects, as indicated below, it is vastly superior to any other system currently available:

(a) Of prime consideration is the fact that this particular laser has been designed as holographic system from the outset rather than as an "improved" industrial laser. Hence its performance is optimised in the crucial areas of holographic performance and, consequently, could be easily configured to holographic camera specification.

(b) A second important area where this particular laser scores over the competition is in its overall size. The laser head, at around 750 mm×75 mm across depending on ultimate configuration, is approximately 1% of the volume of the equivalent commercial system. Its power supply, at about 600 mm×600 mm×100 mm, is barely 2% of the volume of the commercial equivalent. Obviously these size advantages are extremely relevant to any system which needs to be configured for subsea use.

(c) A third significant consideration for subsea use, which this laser addresses, is that the laser should maintain its holographic performance over a wide range of ambient temperatures. Hence, the laser should be able to produce high quality holograms with a variation in cooling water temperature over several degrees. This particular system claims to be able to produce good holograms over a temperature variation of the coolant of ±7.5° C. This performance should be compared with that of a typical system which will only guarantee good quality holograms over a ±0.5° C. spread.

The above laser can be configured in either oscillator-only mode or amplified mode and can be adapted for ruby or frequency-doubled YAG.

An alternative method of camera construction, to mounting the entire laser and optical components in the camera head, is to mount the laser head on a ship or platform and carry the light to the object via an optical fibre. The most suitable arrangement is one in which both object and reference beams are carried by an optical fibre. The reference fibre carries light directly to the film holder, whereas the object fibre carries light to the scene of interest. In this arrangement only the filmholder and fibres need be taken underwater. To maintain the coherence of the laser light single mode fibre should be utilised. Because such fibre has a core diameter of the order of only 5 μm, coupling of light into the fibre is difficult and when taken together with the high attenuation experienced at visible wavelengths, light loss is high. However, successful holograms have been taken using 2 m lengths of fibre. The source used was an argon-ion laser. To ensure that the planes of polarisation of the exit beams were parallel, polarisation rotators have to be included in the optical path. Preferably, a pulsed laser is used as the radiation source. Care must be taken because the high radiance of such lasers can cause melting of the input end of the fibre.

The choice of film size has a considerable bearing on image resolution: the larger the diameter of the film the better is the resolution. For 70 mm film the theoretical image resolution is around 8 μm for ruby laser light at a target distance of 1 m. For 35 mm film the theoretical resolution is about 16 μm. It should also be noted that the viewing angle will be less for the smaller film size.

The quality of the recorded hologram depends to a large extent on the choice of film type and processing techniques. Among the factors to be considered are exposure sensitivity, contrast, resolution and susceptibility to emulsion shrinkage.

An alternative means of recording a hologram is to use thermoplastic film. Such film is commonly used in holographic interferometry. Its many attractive features include rapid electronic processing and reusability.

Ideally the film holder should be able to accommodate holographic film in lengths corresponding to around 250 exposures. This latter number would allow for most applications of a "survey" nature. The film holder should be motor driven at up to 1fps. The size of film chosen obviously has a bearing on size and performance of film holder and eventually holocamera size.

For high resolution holography it is essential that the film be held as flat as possible between thin flat glass plates and should not be stretched or put under any strain during exposure. This requirement dictates that care should be taken in choosing the film transport mechanism.

Generally, high resolution reconstruction of images from holographic recordings requires that any optical aberrations in the system be reduced to a minimum. For systems employing monochromatic light the aberrations of concern are spherical, coma, astigmatism, distortion and field curvature. Assuming recording and replay in air. the above aberrations can be reduced to zero, for point objects, only if a parallel reference beam is used. at both recording and replay stages, and also, if the recording and replay wavelengths are identical.

For the more realistic case of an extended object the situation is similar to that mentioned above: although it is now not possible to reduce the aberrations to zero, they can be minimised if the aforementioned conditions are met.

The collimating lens is chosen to be of a sufficient diameter to entirely illuminate the holographic film. Since it is also not desirable to utilise the maximum diameter of the lens because of the introduction of edge effects the chosen diameter of lens has a firm bearing on the ultimate camera dimensions. To adequately illuminate 70 mm film, for example, a lens diameter of 150 mm is desirable. Consequently this determines a focal length of around 300 mm. For 35 mm film the respective sizes are 50 mm and 100 mm respectively.

A possible method of minimising camera volume would be to carry the reference beam through a length of optical fibre. This can be accomplished successfully at the lower irradiance levels needed for the reference beam.

For optimum holographic recording in terms of brightness and contrast it is generally necessary to ensure that the paths travelled by the object illumination beam and that of the film illumination beam (the reference beam) are identical. This condition can, of course, only be fulfilled for one specific object plane. In practice, though, provided that the entire scene of interest and the reference beam path are matched to within the coherence length of the system good, bright holograms will be obtained. For the lasers under consideration here coherence lengths of the order of a meter or more are typical.

For optimal matching, path length compensation may be incorporated into the camera. Preferably, this would be preset, prior to deploying the camera, for a particular target range. On the other hand, it may be thought desirable, for reasons of stability, to have the reference beam path fixed at the most appropriate length for a majority of situations.

In recording a hologram only light beams polarised in the same plane of vibration can actually interfere to produce the required hologram. Conventionally the object and reference beams are both polarised in the vertical plane of the electric vector. However, light scattered back towards the film plane from small particulates in the water may suffer some depolarisation resulting in some light of the wrong polarisation reaching the film. Although this light would not contribute to the recording of the hologram it could raise the overall fog level of the film and is best removed. A similar effect occurs with light reflected from specular objects in the observation scene itself. These effects can be minimised if a vertically orientated linear polariser is placed in front of the film plane so that only light polarised in the required plane reaches the film.

For some objects the concepts of circular polarisation can be exploited. Light which is circularly polarised in a particular direction changes its "handedness" each time it is reflected. For example, light which is originally "left-hand" polarised will become "right-hand" polarised after one reflection and will return to "left-hand" polarised after two reflections. Generally, light scattered from particulates in sea water will be reflected once, whereas, light reflected from rough objects will experience more than one reflection. If left-hand (say) circularly polarised light is used in object illumination, scattered light will be predominantly right-hand polarised and light reflected from the object scene will possess an approximately even mix of left- and right-hand components. Placing a right-hand polariser at the film plane will ensure that only light reflected from the object will reach the film. Thus the contrast of the image will be improved by removing unwanted scattered light. This process, though, is obviously wasteful of energy since about half the light reflected from the object is thrown away.

The process will only work with rough objects, specular reflectors will experience only one reflection and hence will suffer a reduction in contrast. A quarter-wave plate is needed behind the circular polariser to linearise the light.

To reduce wavefront distortion to a minimum all ancillary components such as mirrors, prisms and beam splitters should have their critical surfaces flat to within $\lambda/20$. Additionally, all transmittive surfaces should be anti-reflection coated to minimise light loss.

The beam splitter as its name suggests divides the intensity of the beam into two parts: one part forming the reference beam and the other forming the object beam. The split is not equal. Most light is needed for object illumination, since much of it is lost in scattering and large angle reflection, while only a small portion need form the reference beam. The portion forming the reference beam is easier to determine since it is this beam which governs overall exposure of the film.

The beam splitter directs about 2% of the incident beam into the reference path. A half-wave plate at the output rotates the plane of polarisation of the reference beam through 90° so that it is in the same plane as the object beam. A similar half-wave plate at the input to the beam splitter controls the relative intensity of both beams such that their ratio can be varied.

Planoconvex lenses are chosen for all applications where a focused laser beam may cause air breakdown. The curved portion of the lens is placed on the opposite side from the incident beam to ensure that light reflected back down the system cannot be refocused in air.

In conventional photography, to prevent unwanted light reaching the film plane a shutter would normally be placed in front of the film and opened at the required time. This could also be done for holography. However, because of the general insensitivity of holographic film to light and the monochromaticity of laser light it is only necessary to position a narrow band wavelength selective filter over the film such that only light from the laser can reach the film and expose it. It should be possible to fabricate the interference as a composite unit together with circular and linear polarisers.

An underwater housing is necessary will protect the camera from ingress of water and external pressure effects. The housing should be designed to withstand a pressure of 30 bar. An optical window should be incorporated to enable emittance and return of light. It is envisaged that the complete system be mounted on a remotely operated vehicle (ROV). Power will be drawn from the ROV system.

The performance and parameters of the holographic replay system have a crucial bearing on the fidelity of the reconstructed image. Ideally, the optical system used in replay should be matched to that of the camera in both geometry and wavelength. Thus the reconstruction system must be designed in conjunction with the camera to ensure that any compromises made in one do, not adversely affect the performance of the other.

Some of the elements required in the reconstruction system share common performance specifications with the similar component in the recording system such as those relating to ancillary mirrors, collimating lens and film holder.

The specific features of replay worthy of particular mention are those relating to the quality of the reconstruction beam and the minimisation of optical aberrations.

We have found that the use of a collimated reference beam at both recording and replay stages was desirable for the attainment of high fidelity images. It is necessary that a high degree of collimation is maintained for both beams with 1 mrad being an acceptable upper limit. The diameter of the collimating lens should at least match that of the recording collimator.

We have also found that for high image fidelity recording and replay wavelengths should preferably be identical. The pulsed lasers used in recording the hologram are unsuitable for reconstructing an image upon which high resolution measurement has to be performed. Hence, it is necessary to pump a tuneable dye laser with a suitable continuous laser such as an argon-ion. Suitable dyes are available to allow reconstruction at both ruby and frequency-doubled wavelengths.

The situation here is of course complicated by the fact that the holograms are recorded in water and subsequently replayed in air. Aberrations will be introduced into the system, the most severe of these being astigmatism and field curvature. Several possible routes present themselves as likely solutions to this problem. The possible solutions are to, (a) correct for aberrations at the recording stage by incorporating correcting elements into the camera configuration, (b) record the hologram in the normal manner and correct for aberrations at the replay stage by incorporating correcting elements into the reconstruction configuration, (c) record and replay without correction and correct by computer manipulation of output data, or, (d) some combination of all three.

Of the above options it would seem that the most appropriate route is to record the hologram in the normal manner and correct for aberrations at the replay stage. The reasons for this being that the camera configuration is kept as simple as possible, thereby keeping it smaller and more reliable, and more complex methods of correction can be employed more readily in a laboratory based replay system.

A specific optic can be designed through which the hologram can be replayed such that the aberrations are corrected.

An initial approach is to replay the hologram through a simple parallel plate such that aberrations introduced by recording the hologram through an optical window are removed.

If the hologram can be replayed at a shorter wavelength than that at which it was recorded such that the wavelength ratio is the inverse of the refractive index ratio between the two media, then it may be possible to remove astigmatism caused by recording in water.

The incorporation of a holographic optical element (HOE) into the replay stage is one means of achieving correction. The holographic optical element is then substituted for an equivalent element made out of glass.

An alternative embodiment relies on replaying the hologram back through a replica of the distorting medium so that aberrations are cancelled resulting in a distortion-free image.

A possible reconstruction facility is shown diagrammatically in FIG. 20. This comprises an argon-ion laser 70 pumping a dye laser 71. The laser beam 72 is directed by way of prisms 73,74 and collimating optics 75 to illuminate the rear of a hologram 76. A pseudoscopic real image 77 is created. Aberrations are corrected by means of an aberration correcting element 78.

I claim:

1. A camera for use in holography comprising:
a source of coherent radiation,
means for splitting radiation from said source into a reference and a recording beam,
film holder means for holding a recording medium,
means for directing the reference beam on to the recording medium,
means for directing the recording beam on to an object,
means for combining the recording beam after reflection from the object with said reference beam to form a hologram within said recording medium, and plano-convex lens means for inhibiting the breakdown of air by back-reflected radiation,
said source of coherent radiation being a frequency-doubled Nd-YAG laser.

2. A camera as claimed in claim 1 wherein the reference beam is positioned at an angle of the order of 30° to the normal with the plane in which film is held in said film holder.

3. A camera as claimed in claim 1 including means selectively responsive to the polarisation of radiation reflected from said source.

4. A camera as claimed in claim 1 including coherence gating means selectively to receive radiation from a predetermined target region.

5. A camera as claimed in claim 1 includes range gating means selectively to receive radiation from a predetermined target region.

6. A camera as claimed in claim 1 including fibre optic light guiding means to conduct radiation from a remote source.

7. A camera as claimed in claim 1 characterised in that it includes a collimating lens (58) of diameter sufficient to illuminate substantially the whole of an exposure area of said recording medium.

8. A camera as claimed in claim 1 including means for compensating for differences between the path lengths of said recording and said reference beams.

9. A camera as claimed in claim 1 characterised in that it includes plano-convex lenses to inhibit the breakdown of air by back-reflected radiation.

10. A camera as claimed in claim 1 including narrow-band filter means selectively to pass radiation from said source to said recording means.

11. A camera for use in holography comprising:
a source of coherent radiation,
means for splitting radiation from said source into a reference and a recording beam;
film holder means for holding a recording medium,
means for directing the reference beam on to the recording medium,
means for directing the recording beam onto an object,
means for combining the recording beam after reflection from the object with said reference beam to form a hologram within said recording medium,
said source of coherent radiation being a frequency-doubled Nd-YAG laser,
a collimating fourier lens of diameter sufficient to illuminate substantially the whole of an exposure area of said recording medium.

* * * * *